United States Patent
Lavin et al.

(10) Patent No.: US 9,160,807 B2
(45) Date of Patent: Oct. 13, 2015

(54) SYSTEM AND METHOD FOR DERIVING A NAME FOR ASSOCIATION WITH A DEVICE

(71) Applicant: Absolute Software Corporation, Vancouver (CA)

(72) Inventors: Karen Lavin, Burnaby (CA); Daragh Lavin, Burnaby (CA)

(73) Assignee: Absolute Software Corporation, Vancouver, BC (CA)

( * ) Notice: Subject to any disclaimer, the term of this patent is extended or adjusted under 35 U.S.C. 154(b) by 310 days.

(21) Appl. No.: 13/861,160

(22) Filed: Apr. 11, 2013

(65) Prior Publication Data

US 2013/0275508 A1  Oct. 17, 2013

Related U.S. Application Data

(60) Provisional application No. 61/623,481, filed on Apr. 12, 2012.

(51) Int. Cl.
*H04L 29/08* (2006.01)
*H04L 29/12* (2006.01)
*H04L 12/24* (2006.01)

(52) U.S. Cl.
CPC .......... *H04L 67/306* (2013.01); *H04L 61/1594* (2013.01); *H04L 41/046* (2013.01); *H04L 61/3065* (2013.01)

(58) Field of Classification Search
CPC ... H04L 61/1594; H04L 67/16; H04L 67/306; H04L 2209/80
See application file for complete search history.

(56) References Cited

U.S. PATENT DOCUMENTS

| | | |
|---|---|---|
| 5,715,174 A | 2/1998 | Cotichini et al. |
| 5,764,892 A | 6/1998 | Cain et al. |
| 5,799,319 A | 8/1998 | Atkins |
| 5,802,280 A | 9/1998 | Cotichini et al. |
| 6,244,758 B1 | 6/2001 | Solymar et al. |
| 6,269,392 B1 | 7/2001 | Cotichini et al. |
| 6,300,863 B1 | 10/2001 | Cotichini et al. |
| 6,507,914 B1 | 1/2003 | Cain et al. |
| 6,885,481 B1 | 4/2005 | Dawe |
| 7,529,773 B2 | 5/2009 | Rogers |
| 7,668,507 B2 * | 2/2010 | Ramsten et al. ............. 455/41.1 |
| 7,739,247 B2 | 6/2010 | Mount et al. |

(Continued)

FOREIGN PATENT DOCUMENTS

| | | |
|---|---|---|
| CA | 2646602 A1 | 9/2007 |
| EP | 2355014 A1 | 8/2011 |

OTHER PUBLICATIONS

Written Opinion issued Jul. 22, 2013 in PCT/CA2013/000350 of Absolute Software Corporation.

(Continued)

*Primary Examiner* — LaShonda Jacobs
(74) *Attorney, Agent, or Firm* — Knobbe, Martens, Olson & Bear, LLP

(57) ABSTRACT

Electronic devices without device names are provided with an application for retrieving a data point from the device from which a name can be deduced. A match for the data point is searched for in the contacts list in the device, and when found, the name corresponding to the contact entry, in which the data point has been found, is used to derive the device name. The derived device name (or information from which the device name may be derived) may be transmitted to a remote server which may be used for managing multiple such devices.

26 Claims, 2 Drawing Sheets

(56) References Cited

U.S. PATENT DOCUMENTS

| | | |
|---|---|---|
| 7,933,877 B2 | 4/2011 | Mount et al. |
| 7,945,709 B2 | 5/2011 | Cain et al. |
| 8,145,638 B2 | 3/2012 | Mount et al. |
| 8,428,568 B1* | 4/2013 | Kim .............................. 455/415 |
| 2004/0123270 A1 | 6/2004 | Zhuang et al. |
| 2005/0086268 A1 | 4/2005 | Rogers |
| 2005/0216757 A1 | 9/2005 | Gardner |
| 2006/0272020 A1 | 11/2006 | Gardner |
| 2007/0293193 A1* | 12/2007 | Ramsten et al. .............. 455/411 |
| 2010/0215272 A1 | 8/2010 | Isaev |
| 2010/0281102 A1 | 11/2010 | Chinta et al. |
| 2011/0173251 A1 | 7/2011 | Sandhu et al. |
| 2011/0179033 A1 | 7/2011 | Mount et al. |
| 2012/0017143 A1 | 1/2012 | Li et al. |
| 2012/0084308 A1 | 4/2012 | Kang |
| 2012/0124079 A1 | 5/2012 | Kinsella |
| 2012/0225643 A1* | 9/2012 | Park ........................... 455/414.1 |
| 2013/0012121 A1* | 1/2013 | Chen et al. ...................... 455/39 |
| 2013/0244622 A1* | 9/2013 | Hillier et al. ................ 455/414.1 |
| 2014/0179290 A1* | 6/2014 | Jung ............................. 455/415 |

OTHER PUBLICATIONS

International Search Report issued Jul. 22, 2013 in PCT/CA2013/000350 of Absolute Software Corporation.

* cited by examiner

SYSTEM AND METHOD FOR DERIVING A NAME FOR ASSOCIATION WITH A DEVICE

PRIORITY CLAIM

This application claims the benefit of U.S. Provisional Patent Application No. 61/623,481, filed on Apr. 12, 2012, the disclosure of which is hereby incorporated by reference.

TECHNICAL FIELD

This disclosure relates to the determination of a name to be associated with an electronic device.

BACKGROUND

When remotely managing multiple electronic devices it is useful to record a name associated with each device, together with the data of interest pertaining to the device. A meaningful name can assist a manager to identify and select data for a specific device to be managed. In some cases, electronic devices contain a data field, in which is stored a device name such as "Alison's Phone." If present, such a device name can be automatically retrieved and stored with data pertaining to the device. In other cases, electronic devices do not contain a data field for a device name. In these cases, the database used for device management will ordinarily have a blank entry for the device name and a manager will instead have to use an identification number to select data pertaining to the device of interest, or add in a name manually.

SUMMARY

An application program installed in an electronic device attempts to automatically discover a descriptive name for the device by searching for and retrieving a pertinent data point that relates to a user or owner of the device. The data point may, for example, be a phone number or email address associated with the device. The application compares the data point to entries in a contacts list in the electronic device, and if a match is found, uses the retrieved entry for the name for the device. The retrieved entry may include a name associated with an email address, or a part of such a name, and the email address may be that of the owner of the device. Alternately, the data point may be the telephone number of the device found in a SIM (subscriber identity module) card or elsewhere in the device, and the name would be the name in the contacts list that is associated with the telephone number. This is possible as many people add their own contact information as an entry in the contacts list, or, in other cases, the information may be added automatically.

The result is that a meaningful name may be automatically deduced for an electronic device without the user having to expressly enter one. This is true irrespective of whether the electronic device has a field for a device name or not.

In some embodiments, all or a portion of the process may alternatively be executed on a server, or on some other computing device or system other than the device being named. For example, if a mobile device is configured to synchronize its contacts list with a server or a cloud-based computing system, the search for a matching contact may be performed by the server or cloud-based computing system based on information received from the device.

This summary is not an extensive overview intended to delineate the scope of the subject matter that is described and claimed herein. The summary presents aspects of the subject matter in a simplified form to provide a basic understanding thereof, as a prelude to the detailed description that is presented below.

BRIEF DESCRIPTION OF THE DRAWINGS

For a fuller understanding of the nature and advantages of the disclosed subject matter, as well as the preferred mode of use thereof, reference should be made to the following detailed description, read in conjunction with the accompanying drawings. In the following drawings, like reference numerals designate like or similar parts or steps. Components of the drawings are not to scale.

DETAILED DESCRIPTION OF SPECIFIC EMBODIMENTS

Figure 1:
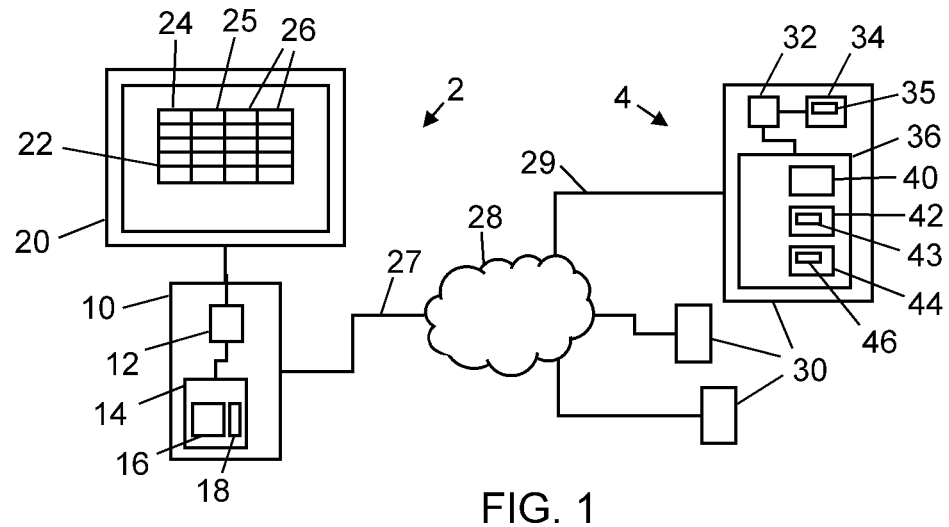
FIG. 1 is a schematic functional block diagram showing a system for determining a name to be associated with an electronic device.

Referring to FIG. 1, an example of a management system 2 is shown, such as a device management system, which benefits from the system 4 for determining a name associated with an electronic device. The management system 2 includes a server 10 with a processor 12 connected to memory 14, in which is stored computer readable instructions 16 and computer readable data 18. The computer readable instructions 16, when processed by the processor 12, cause a monitor 20 to display a table 22 containing information about multiple electronic devices. The table 22 has an ID number column 24, an electronic device name column 25, and one or more further columns 26 with data useful for managing the electronic devices.

The server 10 of the management system 2 is connected to the internet or other communications network 28 via link 27, which is traditionally wired but may instead be wireless. The server 10 is connected via the internet 28 and links such as link 29 to multiple electronic devices 30 which are to be managed by the management system 2. Link 29 will most often be wireless, as most electronic devices 30 are mobile devices, but in some cases, link 29 may be wired. Examples of electronic devices 30 include a laptop, a notebook, a desktop computer, a mobile phone, a netbook, a tablet, an Android™ device, a BlackBerry™ device, a Windows™ phone, an iPad™, an iPod Touch™ and an iPhone™, or any other electronic device that would benefit from having, or being designated with, a meaningful electronic device name.

The server 10 communicates with the electronic devices 30 in order to retrieve data, send data, send commands, and to receive a meaningful or descriptive device name.

The multiple electronic devices 30 each include a processor 32, which may be connected to a module 34 if installed. The module 34, if fitted, may be a SIM card that stores a telephone number 35 for the electronic device 30. For CDMA (code division multiple access) devices, the module 34 may be a radio module, in which the telephone number 35 is stored. The processor is also connected to a memory 36. The memory 36 stores an application 40 for determining a name associated with the electronic device 30. The memory may also store an account manager 42 embodied in an OS and a contacts list 44. The application 40 for determining a name associated with the electronic device 30 may be downloaded from the management server 10 or another server. The application 40 may be part of a larger application in the electronic device 30. For example, it may be part of an application for facilitating remote management of the electronic device.

The application 40 is configured to retrieve a telephone number 35 stored in the module 34, to retrieve an email address 43 from the account manager 42 via a public API, or both. On devices with an account manager, the application 40 queries the account manager 42 for all Exchange™ accounts. If it finds one, or some, then it uses the first Exchange™ email address 43 returned as the one to search for in the contacts list 44. If no Exchange™ accounts are configured, then application 40 queries the account manager 42 for Google™ accounts and uses the first account returned. In other embodiments, other types of email account may be searched for. The application 40 is also configured to compare the contents of the contacts list 44 with the retrieved telephone number 35 or the retrieved email address 43 (or both). If the application 40 finds a match between an entry 46 in the contacts list 44 and a retrieved data point such as the telephone number 35 or an email address 43, then the application 40 associates the name stored in entry 46 with the electronic device 30. The application 40 can then transmit the name to the server 10.

Figure 2:
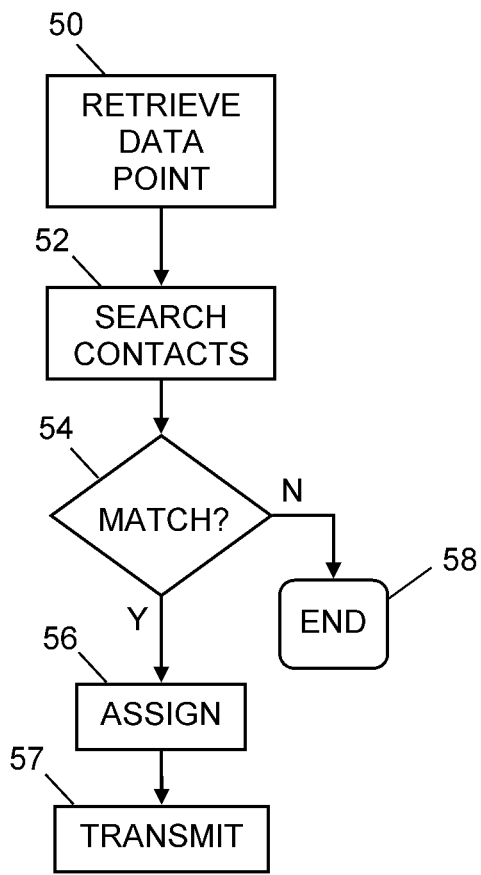
FIG. 2 is a flowchart of a process performed by an electronic device to determine a name to be associated with the electronic device.

Referring to FIG. 2, a flowchart shows the general process performed by application 40 in an electronic device 30 to determine a name associated with the electronic device. In step 50, the application 40 retrieves an identifying data point from the electronic device. The data point is ordinarily associated uniquely, or at least identifiably, with the user or owner of the device. In step 52, the application 40 searches the contents of the contacts list 44 for a contact that has a data point that matches with the data point retrieved from the electronic device. If, in step 54, a matching data point is found, then the application in step 56 assigns the name of the contact (or a portion of the name), which has the matching data point, to the electronic device. The name is then transmitted, in step 57, to the management system 2, which stores it as computer readable data 18 in memory 14, where it is related with other data relating to the management of the electronic device 30. The name may be displayed in table 22 on screen 20, in a device name column 25, with other data relating to the device in the same row. If, however, at step 54, there is no match, then the process ends at step 58.

In some embodiments, additional characters may be added to the matching contact's name to form the device name. For example, if the matching contact's name is "Bob Smith" and the device is an iPhone™, the application may assign "Bob Smith's iPhone™" as the device name.

Figure 3:
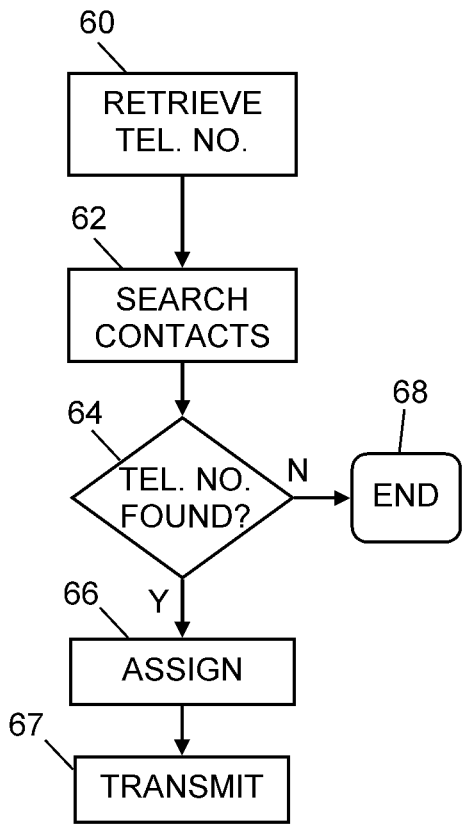
FIG. 3 is a flowchart of a process performed by an electronic device to determine a name to be associated with the electronic device by matching a telephone number.

Referring to FIG. 3, a flowchart shows a specific example of the process performed by application 40 in an electronic device 30 to determine a name associated with the electronic device. In one embodiment, this process will only be performed if the electronic device is fitted with a module 34, such as a SIM card or a CDMA radio module, that stores the device's telephone number. In step 60, the application 40 retrieves the telephone number 35 of the electronic device from the module 34. In step 62, the application 40 searches the contents of the contacts list for a contact that has the same telephone number as that of the electronic device. (As mentioned above, this search may alternatively be performed on another device or system that stores a copy of the contacts list.) If, in step 54, a matching telephone number is found, then the application in step 66 assigns the name of the contact (or portion), which has the matching telephone number, to the electronic device. The assigned device name is then transmitted, in step 67, to the management system 2, which stores it as computer readable data 18 in memory 14, where it is related with other data relating to the management of the electronic device 30. The name may be displayed in table 22 on screen 20, in a device name column 25, with other data relating to the device in the same row. If, at step 64, there is no match, then the process ends at step 68.

Figure 4:
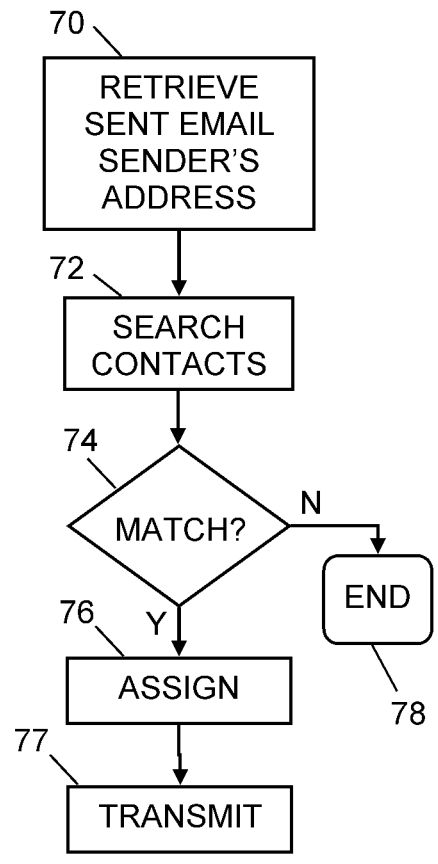
FIG. 4 is a flowchart of a process performed by an electronic device to determine a name to be associated with the electronic device by matching an email sender's address.

Referring to FIG. 4, a flowchart shows another example of a process performed by application 40 in an electronic device 30 to determine a name to be associated with the device. In step 70, the application 40 retrieves the email address 43 from the account manager 42 in the electronic device 30. For example, the email address may belong to a user of the device who has used the device to send an email. In step 72, the application 40 searches the contents of the contacts list for a contact that has an email address that matches with the email address retrieved from the account manager 42. If, in step 74, a matching email address is found, then the application in step 76 assigns the name of the contact, which has the matching email address, to the electronic device. The name is then transmitted, in step 77, to the management system 2, which stores it as computer readable data 18 in memory 14, where it is related with other data relating to the management of the electronic device 30. (As mentioned above, the application 40 may alternatively use only a portion of the matching contact's name for the device name, and/or may add additional characters.) The name may be displayed in table 22 on screen 20, in a device name column 25, with other data relating to the device in the same row. If, however, at step 74, there is no match, then the process ends at step 78.

When the processes described in FIGS. 2-4 end without the assignment of a device name, then the management system 2 will not receive a name for the device 30, and the administrator using the management system may refer to individual devices by an identification number or subscription number in column 24 of the table 22.

Figure 5:
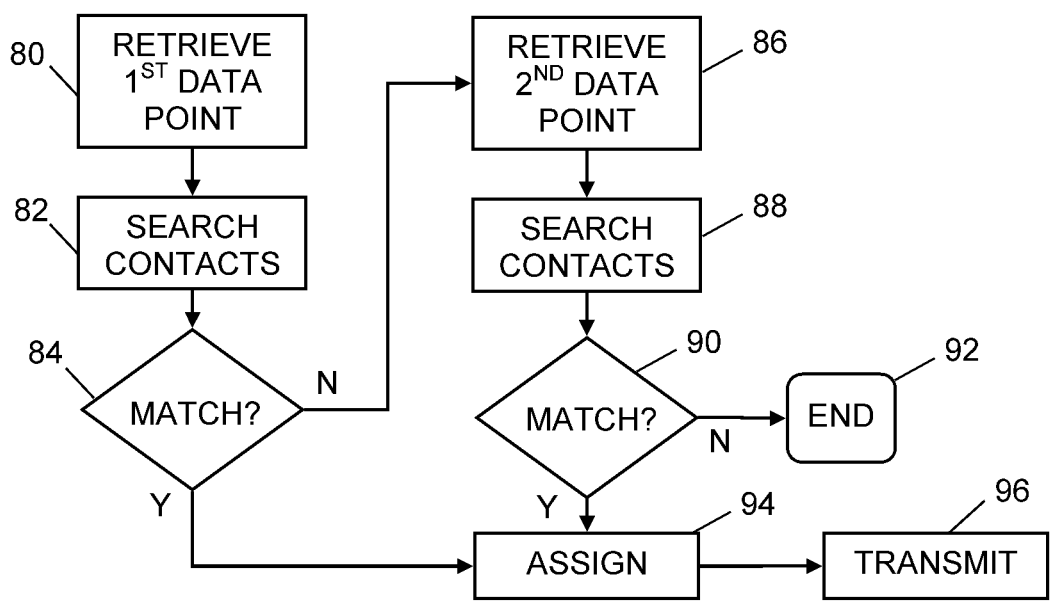
FIG. 5 is a flowchart of a multiple search process performed by an electronic device to determine a name to be associated with the electronic device.

Two or more processes may be run together, either in parallel or in series. Referring to FIG. 5, a flowchart is shown of two consecutive processes carried out by application 40 in an electronic device 30 to determine a name to be associated with the electronic device. In step 80, the application 40 retrieves a first data point from the electronic device. In step 82, the application 40 searches the contents of the contacts list for a contact that has a data point that matches with the first data point retrieved from the electronic device. If, in step 84, a matching data point is found, then the application in step 94 assigns the name of the contact, which has the matching data point, to the electronic device. The name is then transmitted, in step 96, to the management system 2, which stores it as computer readable data 18 in memory 14, where it is related with other data relating to the management of the electronic device 30. The name may be displayed in table 22 on screen 20, in a device name column 25, with other data relating to the device in the same row. If, however, at step 84, there is no match, then the process proceeds to step 86, in which the application 40 retrieves a second data point from the electronic device. In step 88, the application 40 searches the contents of the contacts list for a contact that has a data point that matches with the second data point retrieved from the electronic device. If, in step 90, a matching data point is found, then the application in step 94 assigns the name of the matching contact (optionally with modifications as described above) to the electronic device. The device name is then transmitted, in step 96, as before. If, however, at step 90, there is no match, then the process ends at step 92.

In each of the processes described above, the task of assigning the device name may alternatively be performed by the management system 2 based on information collected and reported by the device 30. For example, the device 30, under the control of the application 40, may report to the management system 2 the name of the matching contact and a descriptor of the device (e.g., "Phone," "iPhone™," "iPhone™ 5," "Android™ phone," "e-reader," "tablet," etc.). The management system 2 may then use the reported information to select an appropriate name. The naming convention used for this purpose may depend on the level of uniqueness of the reported information. For example, if the name of the matching contact is a common name or one that already exists in the management system 2, reported information about the device may be added to create a name that is unique or more unique.

Variations and Further Features

The process of FIG. 5 may be modified in that the two data points may be retrieved from the electronic device at the start, with the contacts list being searched through once, for both of the data points. If either one of them matches, then the process would jump to step 94 to assign the corresponding name to the device.

Depending on the configuration, other identifying data points may be retrieved from the electronic device to be used when searching for a matching data point in the contacts list of the electronic device. Examples of other identifying data points include Skype™ address and VOIP (voice over internet protocol) address.

If no matching data point is found, then the application 40 may prompt the user of the device to enter his name, and email and/or telephone number as an entry in the contacts list. At this point, or later on, the application 40 may be re-run and will then find the user's name when searching for the number found in the SIM card or radio module, or the email address found in the account manager.

Systems other than management systems 2 may benefit from the application 40 residing in multiple electronic devices.

In some embodiments, the application on the remote device may be supported by an agent. Such an agent, as used herein, is a software, hardware or firmware (or any combination thereof) agent that is ideally persistent and stealthy, and that resides in a host computer or other electronic device. The agent facilitates servicing functions which require communication with a remote server. The agent is tamper resistant and is enabled for supporting and/or providing various services such as data delete, firewall protection, data encryption, location tracking, message notification, and software deployment and updates. An illustrative embodiment of a suitable agent is found in the commercially available product Computrace Agent™. The technology underlying the Computrace Agent™ has been disclosed and patented in the U.S. and other countries, the patents having been commonly assigned to Absolute Software Corporation. See, for example, U.S. Pat. Nos. 5,715,174; 5,764,892; 5,802,280; 6,244,758; 6,269,392; 6,300,863; 6,507,914; and 7,945,709 and related foreign patents. Details of the persistent function of the agent are disclosed in U.S. Patent Application Publication Nos. US2005/0216757 and US2006/0272020. The disclosures of all of these documents are fully incorporated by reference as if fully set forth herein. Ideally, the agent is also persistent, and able to self-repair if it includes software. It may in part or in whole be located in the BIOS, in BIOS option ROM, or in an equivalent location in an electronic device. Communications may be initiated by the agent, by the remote server or by both. The agent may be divided into multiple parts in different locations within an electronic device. The agent may ensure the presence of the application 40 and its integrity, and if it is found to be compromised or out of date, it can initiate the download of a new application 40 from the server.

The present description is of the best presently contemplated mode of carrying out the subject matter disclosed and claimed herein. Steps may be performed in a different order to those shown herein. Some steps may be omitted and others may be added without altering the key aspects of the invention. Likewise, some of the components and modules may be omitted and others added without altering the key aspects of the invention. The description is made for the purpose of illustrating the general principles of the subject matter and not be taken in a limiting sense; the claimed subject matter can find utility in a variety of implementations without departing from the scope of the invention made, as will be apparent to those of skill in the art from an understanding of the principles that underlie the invention. The scope of the invention is best determined with reference to the appended claims.

The invention claimed is:

1. A computer-implemented method of selecting a name to assign to an electronic device that has a contact list stored thereon, said contact list comprising a plurality of contact entries, the method comprising:

retrieving, by a processor of the electronic device, from a data source on the device that is separate from the contact list, a data point associated with the electronic device, said data point being an identifier used for communications between devices;

searching the contact list for a contact entry that includes the data point;

in response to locating a contact entry that includes the data point, extracting a contact name from the contact entry; and selecting, as a device name to assign to the electronic device, a name that includes at least a portion of the contact name.

2. The method of claim 1, wherein the data point comprises a telephone number associated with the electronic device.

3. The method of claim 2, wherein retrieving the data point comprises retrieving the telephone number from a subscriber identity module.

4. The method of claim 2, wherein retrieving the data point comprises retrieving the telephone number from a radio module of the electronic device.

5. The method of claim 1, wherein the data point comprises an email address associated with the electronic device.

6. The method of claim 5, wherein retrieving the data point comprises retrieving the email address from an account manager.

7. The method of claim 1 wherein the data point is a voice over internet protocol address.

8. The method of claim 1, wherein selecting the device name comprises combining at least a portion of the contact name with a descriptor of the electronic device.

9. The method of claim 8, wherein the descriptor of the electronic device comprises a model name of the electronic device.

10. The method of claim 1, wherein the method is performed in its entirety by the electronic device under the control of program code.

11. The method of claim 1, wherein the step of selecting the device name is performed by a computing system that is separate from the electronic device, based at least partly on information received from the electronic device.

12. The method of claim 1, wherein the step of searching the contact list is performed by a computing system that is separate from the electronic device using a copy of the contact list stored on the electronic device.

13. The method of claim 1, further comprising automatically assigning the selected device name to the electronic device in a device management system that is separate from the electronic device.

14. A non-transitory computer-readable medium that stores executable program code that directs an electronic device to at least:
   retrieve, from a data source that is separate from a contact list stored on the electronic device, a data point associated with the electronic device, said data point comprising an identifier used for communications between devices;
   search the contact list for a contact entry that includes the data point;
   in response to locating a contact entry that includes the data point, extract a contact name from the contact entry; and
   transmit at least a portion of the extracted contact name on a network to a device management system.

15. The computer-readable medium of claim 14, wherein the executable program code directs the electronic device to:
   select a device name to assign to the electronic device such that the device name includes at least the portion of the contact name; and
   transmit the device name to the device management system.

16. The computer-readable medium of claim 15, wherein the executable program code directs the electronic device to select the device name by combining at least the portion of the contact name with a device descriptor.

17. The computer-readable medium of claim 14, wherein the data point comprises a telephone number associated with the electronic device.

18. The computer-readable medium of claim 17, wherein the phone number is retrieved from a subscriber identity module of the electronic device.

19. The computer-readable medium of claim 17, wherein the phone number is retrieved from a radio module of the electronic device.

20. The computer-readable medium of claim 14, wherein the data point comprises an email address associated with the electronic device.

21. The computer-readable medium of claim 14, wherein the data point is a voice over internet protocol address.

22. The computer-readable medium of claim 14, in combination with the device management system, wherein the device management system is configured to use at least the portion of the contact name received from the electronic device to assign a device name to the electronic device.

23. The computer-readable medium of claim 14, in combination with the electronic device, wherein the computer-readable medium is a memory of the electronic device.

24. The computer-readable medium of claim 14, wherein the executable code is additionally configured to cause the electronic device to prompt a user to enter at least a name of the user when the search of the contact list is unsuccessful.

25. An electronic device, comprising:
   a processor coupled to a memory;
   a contact list stored in the memory, said contact list comprising a plurality of contact entries; and
   executable code stored in the memory, said executable code comprising instructions that direct the processor to at least:
      retrieve, from a data source other than the contact list, a data point associated with the electronic device;
      identify, by searching the contact list, a matching contact entry that includes the data point; and
      transmit, to a device management system, at least a portion of a contact name included in the matching contact entry.

26. The electronic device of claim 25, wherein the executable code additionally directs the processor to select a device name to assign to the electronic device such that the device name includes at least the portion of the contact name.

* * * * *